United States Patent [19]

Christ et al.

[11] 4,118,040
[45] Oct. 3, 1978

[54] CONTACTLESS SEAL

[75] Inventors: Alfred Christ; Helmut Lehmann, both of Zurich; Ludwig Kantor, Mutschellen; Helmut Miller, Niederrohrdorf, all of Switzerland

[73] Assignee: Sulzer Brothers Limited, Winterthur, Switzerland

[21] Appl. No.: 718,085

[22] Filed: Aug. 26, 1976

[30] Foreign Application Priority Data
Aug. 29, 1975 [CH] Switzerland ............... 11219/75

[51] Int. Cl.² ........................................... F16J 15/34
[52] U.S. Cl. ................................. 277/75; 277/96.1
[58] Field of Search ............... 277/96.1, 3, 27, 75, 277/70–79; 251/1 B

[56] References Cited
U.S. PATENT DOCUMENTS

| 1,876,515 | 9/1932 | Emmet | 277/3 |
| 2,688,981 | 9/1954 | Greer et al. | 277/27 |
| 3,093,382 | 6/1963 | Macks | 277/96.1 |
| 3,737,139 | 6/1973 | Watts | 251/1 B |

Primary Examiner—Robert I. Smith
Attorney, Agent, or Firm—Kenyon & Kenyon, Reilly, Carr & Chapin

[57] ABSTRACT

The pressure chamber located in the sealing member is sub-divided by webs into a plurality of individual sub-chambers with restrictors between each sub-chamber and the barrier medium supply in order to obtain a uniform adjustment over the entire periphery of the gap between the sealing member and rotating part. Various types of means such as pressure-filled tubes are used to bias the sealing member from within a groove in the stationary part towards the rotatable part.

19 Claims, 16 Drawing Figures

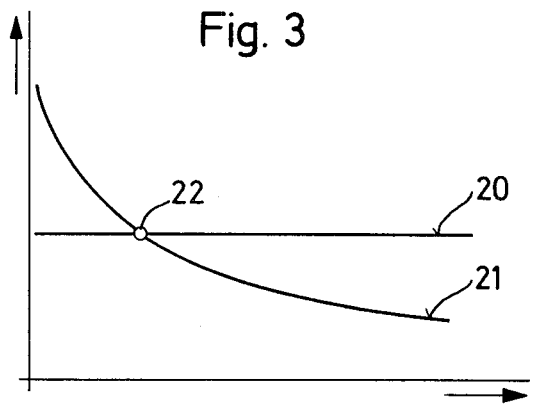
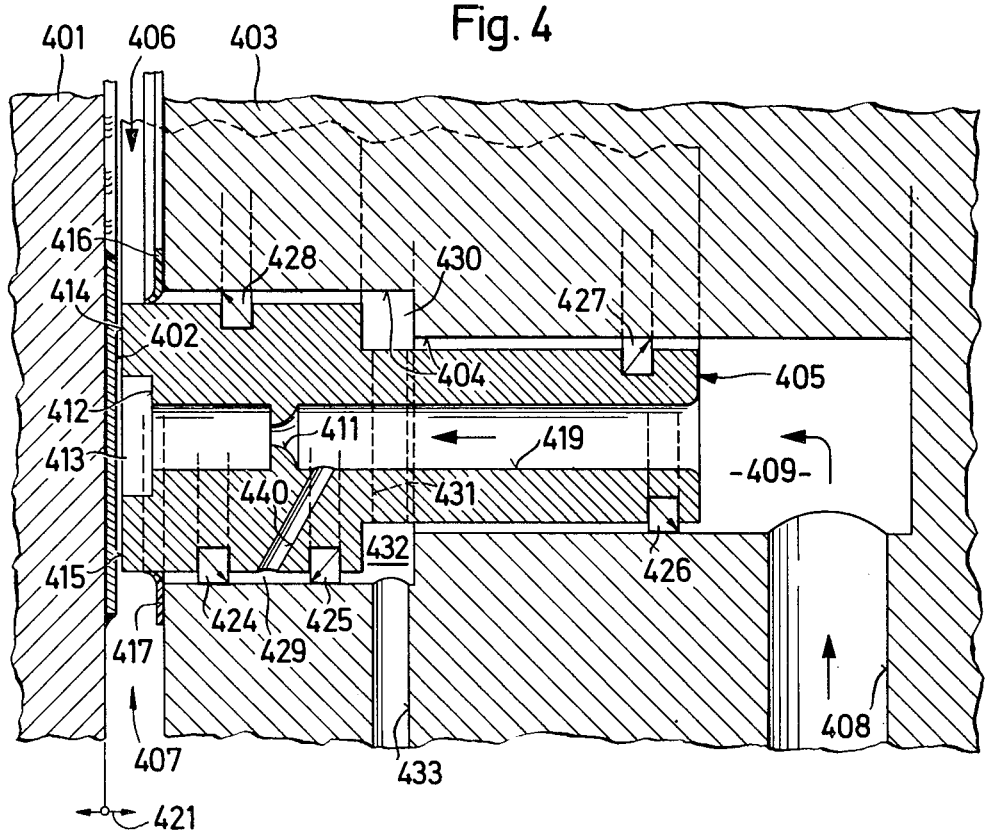

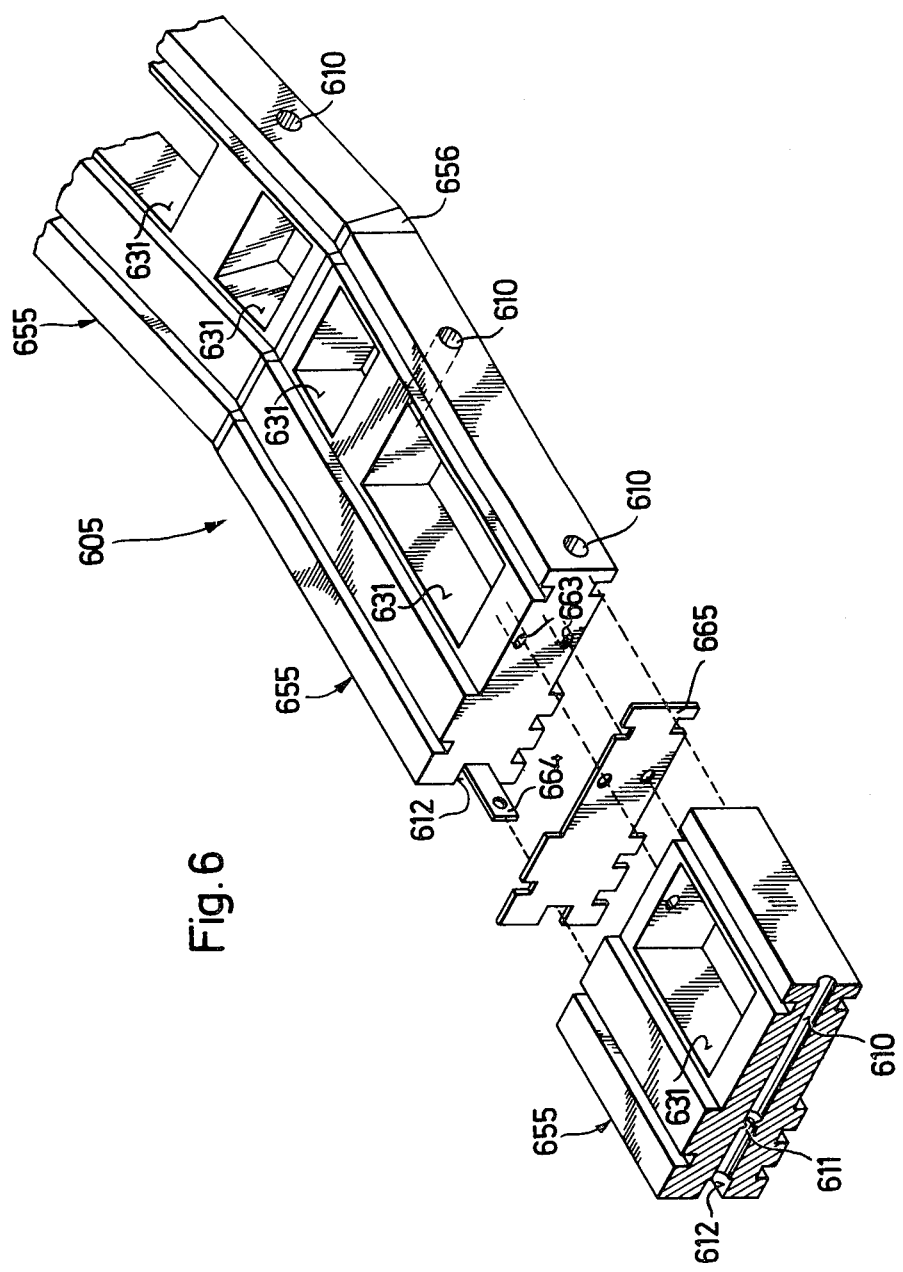

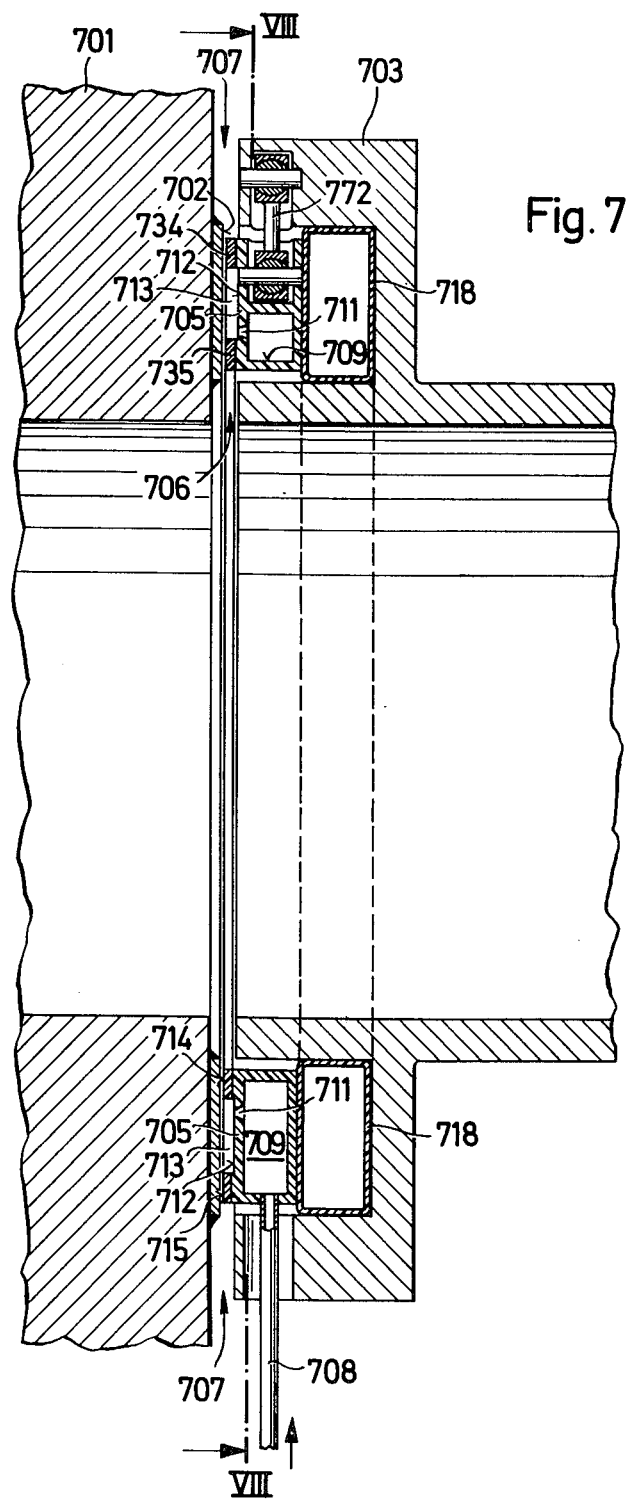

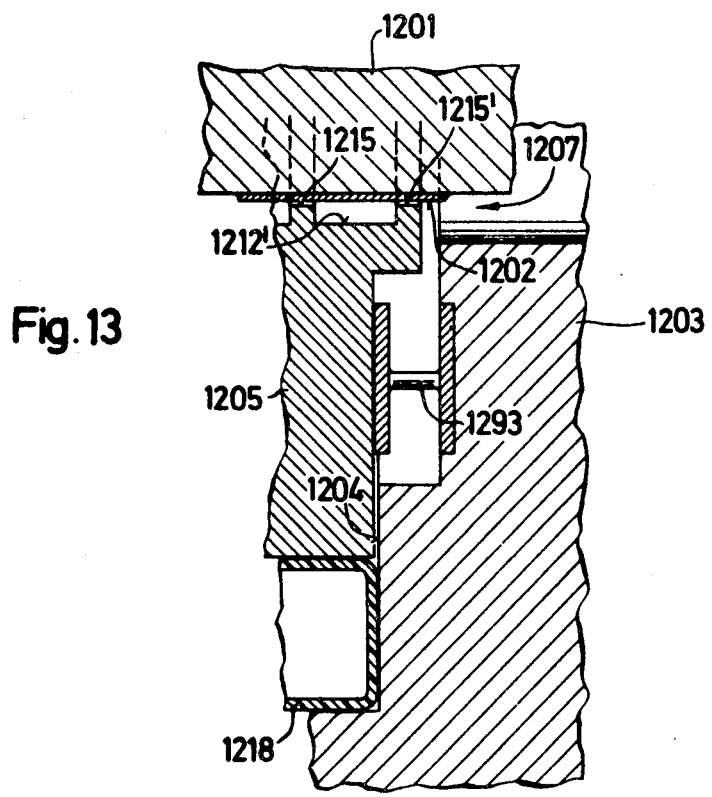
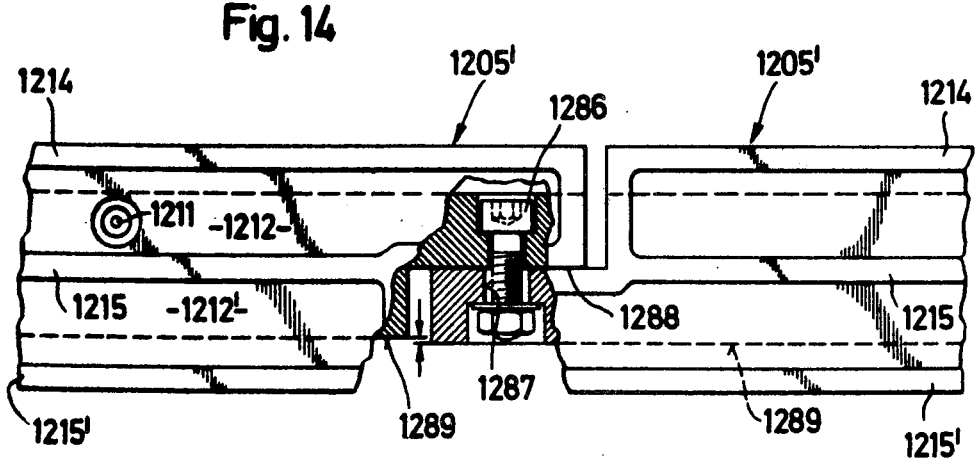

CONTACTLESS SEAL

BACKGROUND OF INVENTION

This invention relates to a contactless seal and, particularly, to a contactless seal between a rotatable part and a stationary part.

As is known, various types of contactless seals have been used to seal a gap or space defined between a stationary part and a rotating part. For example, one such contactless seal has been known to use a sealing member which surrounds the axis of rotation of the rotatable part with at least two sealing surfaces concentric to the axis and which is movably disposed on the stationary part. The sealing member also has a pressure chamber which is open towardsthe rotatable part and is connected to a supply of a barrier medium. This pressure chamber is further formed in the sealing member between two adjacent sealing surfaces, and the sealing member is pressed by a pressure force against a surface on the rotatable part so as to leave gaps for the barrier medium to escape between the cooperating sealing surfaces.

A seal of this kind is disclosed in U.S. Pat. No. 3,606,568, which relates to sealing of a water turbine and which has sealing surfaces lying on a large radius (e.g. 2 to 5 meters), the speed of the rotating part relative to the stationary part being up to 150 meters per second. The barrier medium is filtered water, thus preventing sandy water, if present, from flowing out of the turbine housing. The barrier medium is supplied to the pressure chamber without throttling and the pressure of the barrier medium in the pressure chamber is constant. The gap width between the sealing surfaces should be adjusted to an equilibrium width since the force tending to widen the gap which is caused by the pressure of the barrier medium therein decreases as the flow speed increases, i.e., as the gap width increases. This is due to the Bernoulli law, which holds that the pressure of a medium decreases with the square of the increasing flow speed. Thus, when this seal is used, the gap width must be relatively large. However, this results in corresponding losses of barrier medium.

Accordingly, it is an object of the invention to provide a contactless seal which can operate in a state of equilibrium with very small gap widths.

Briefly, the invention provides a contactless seal for sealing a space between a stationary part and a rotatable part which is disposed to rotate about an axis of rotation. The contactless steel includes a sealing member which is disposed about the axis of rotation and has at least two sealing surfaces concentric to the axis of rotation and spaced from the rotatable part to define gaps therebetween for the escape of barrier medium. The sealing member is also movably mounted on the stationary member for movement under a biasing force towards the rotatable member. In addition, the seal includes a pressure chamber in the sealing member between the sealing surfaces, which chamber is open towards the rotatable part and is connectable to a supply of barrier medium. A plurality of transverse webs are located in the chamber to sub-divide the chamber into a plurality of individual sub-chambers distributed peripherally of the sealing memer. Each of these individual sub-chambers is connected to the supply of barrier medium to receive a flow of barrier medium therefrom. Also, a plurality of restrictors are provided with each restrictor being disposed between a respective one of the individual sub-chambers and the supply of barrier medium to throttle the flow of barrier medium to the respective individual sub-chamber.

As a result of the aforementioned seal structure, the prior-art pressure chamber, which was continuous in the peripheral directions, is divided into a number of small individual chambers and the pressure of the barrier medium in the individual chambers varies with the gap width as a result of the upstream restrictors. If the gap width in the seal becomes larger, more barrier medium escapes, so that the pressure in the individual chamber concerned falls as a result of the throttle effect. This reduces the forces tending to open the gap, whereas the forces tending to narrow the gap and caused by the pressure acting on the sealing member remain constant. As a result, the sealing member has a stable equilibrium position with a very narrow gap width. This mechanism, which rigidly determines the gap width, operates uniformly over the entire seal periphery, since the webs between the individual chambers prevent circumferential compensating flows occurring from one chamber to the next. As a result, the seal is uniformly adjusted over the entire periphery to the desired gap width, even if the sealing surface of the rotating part is not completely flat but somewhat corrugated. In order to ensure the adaptability of the seal to irregularities in the sealing surfaces on the rotating part, the sealing member must have some flexibility. However, this usually results from the large sealing radius, even if the sealing member is made of conventional metallurgical material. Thus, since the seal operates with narrow gaps than the previously known seal, the losses of barrier medium are correspondingly lower, so that the seal can be used more economically.

According to one advantageous embodiment, a chamber is provided in the stationary part adjacent the sealing member and is connected to the supply of barrier medium, so that the barrier medium also exerts pressure on the sealing member. This simplifies the structure of the seal, since there is no need for a separate supply of pressure medium.

According to another embodiment, the sealing member is made up of a number of straight portions which form a polygonal ring or array which is guided axially in a correspondingly-shaped annular groove in the stationary part. In this embodiment, elastic intermediate members can be disposed between the straight portions, thus providing a particularly resilient embodiment of the seal.

These and other objects and advantages of the invention will become more apparent from the following detailed description and appended claims taken in conjunction with the accompanying drawings in which:

FIG. 3 illustrates a graph of the force and gap width relation of the seal of FIG. 1;

FIG. 4 illustrates a vertical sectional view through another embodiment of the contactless seal according to the invention;

FIG. 6 illustrates a perspective view of an alternative embodiment of the sealing member of FIG. 4;

FIG. 7 illustrates a vertical sectional view through another embodiment of the invention;

FIG. 13 illustrates a variant of a detail of the seal of FIG. 12; and

FIG. 14 illustrates a view of the sealing member of FIG. 12.

Figure 1:
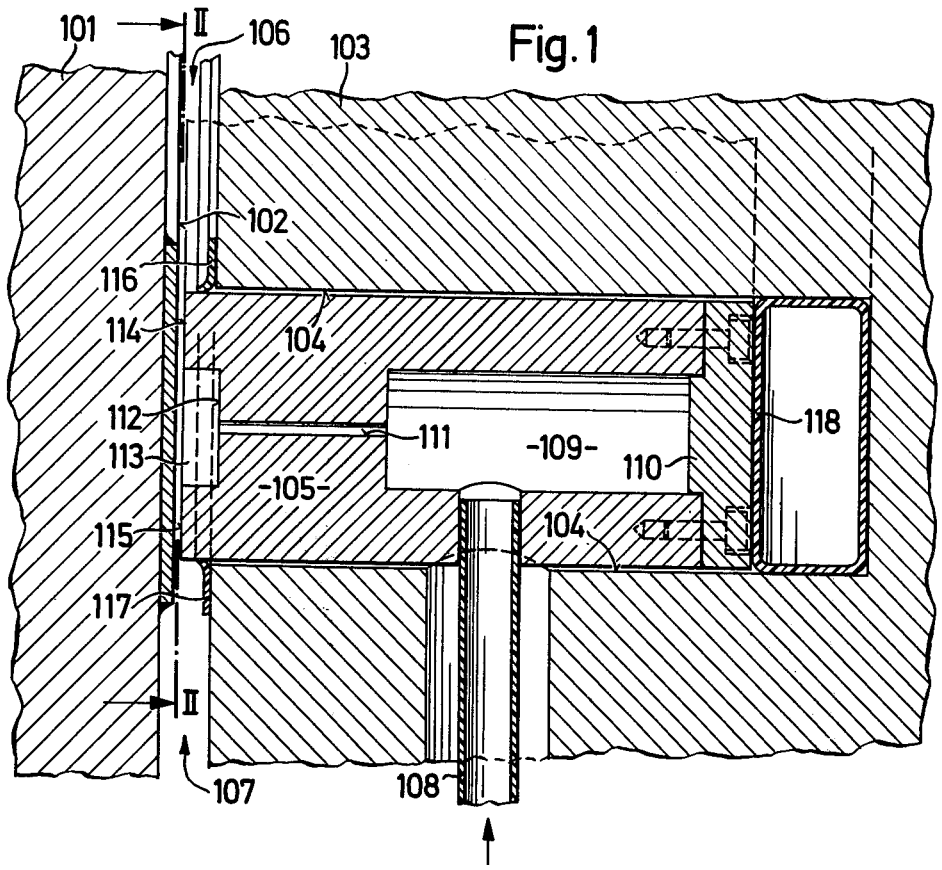
FIG. 1 illustrates a vertical sectional view through the bottom part of a contactless seal according to the invention.

Referring to FIG. 1, a rotatable part 101, e.g. the rotor of a water turbine, and a stationary part 103, e.g. the turbine housing are spaced apart to define a space therebetween. The axis of rotation (not shown) of the rotatable part 101 is located above the parts 101, 103 as viewed in FIG. 1. The stationary part 103 has an annular groove 104 extending concentrically to the axis of rotation through the part 103. A contactless seal is positioned between the parts 101, 103 and includes a sealing member 105 guided in the axial direction in the groove 104. At the left end face as viewed in FIG. 1, the sealing member 105 forms two sealing surfaces 114, 115 which are concentric to the axis of rotation and define a pressure chamber therebetween. These surfaces 114, 115 cooperate without contact with a sealing surface 102 on the rotating part 101. In FIG. 1, therefore, a chamber 106 above the sealing surface 114 is at a higher pressure than a chamber 107 which is below the sealing surface 115 and is e.g. connected to atmosphere.

Figure 2:
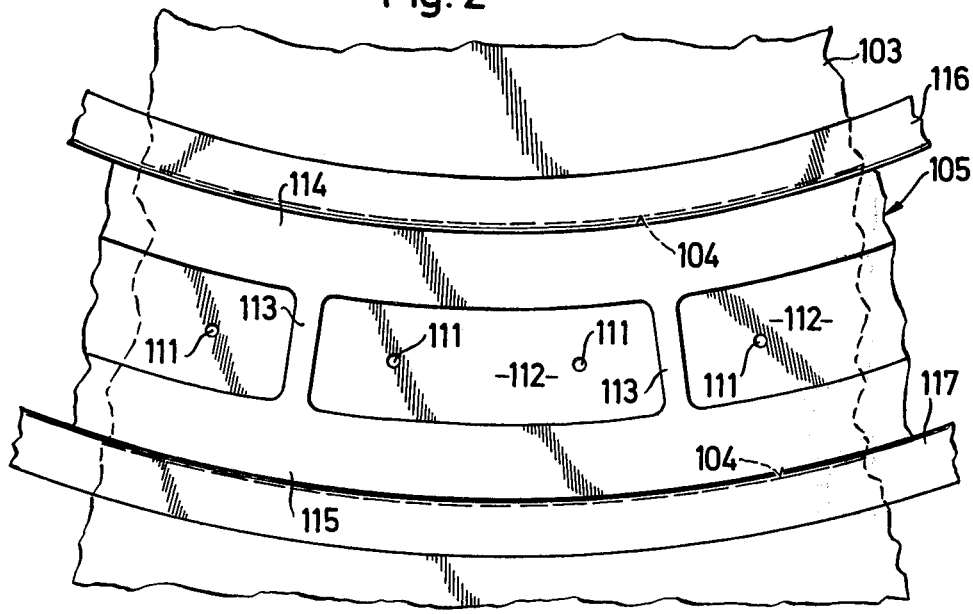
FIG. 2 illustrates a view taken on line II—II of FIG. 1.

The sealing member 105 contains a distribution chamber 109 for a barrier medium which is supplied from a suitable supply (not shown) by a flexible line 108. The right side of chamber 109 as viewed in closed by a cover 110. Restrictors in the form of throttle bores 111 extend from the chamber 109 to individual pressure chambers 112 formed in the left end face of sealing member 105. As FIG. 2 shows, the individual pressure chambers 112 are separated by transverse webs 113 and are uniformly distributed around the periphery of the member 105. The webs 113 extend axially from the plane of the sealing surfaces 114, 115 through the entire depth of the pressure chambers 112.

As shown in FIG. 1, a resilient tube 118 is disposed inside the groove 104 to the right of cover 110 and is connected, in a manner not shown, to a supply of pressure medium. Lip seals 116, 117 are secured to the stationary part 103 and their lips abut the sealing member 105, so that no medium can escape from the chambers 106, 107 into groove 104.

The contactless seal operates as follows. A pressure medium, e.g. water, supplied to the tube 118 biases the sealing member 105 towards the sealing surface 102 of the rotating part 101. A barrier medium such as filtered water is supplied through the line 108 to the distribution chamber 109 and flows through the throttle bores 11 into the individual pressure chambers 112. The pressure of the pressure medium and of the barrier medium are adjusted in known manner (not shown) in dependence on the pressure in the chamber 106; chamber 107 being regarded as connected to atmosphere. It the pressure in chamber 106 is assumed to be constant, the pressure of the pressure medium in the tube 118 is also constant as a result of the aforementioned adjustment, i.e., the sealing member 105 is pushed to the left in FIG. 1 with a constant force, thus narrowing the gap between the sealing surfaces. In the graph of FIG. 3, this constant force is represented by a straight line 20. The barrier medium, which is supplied at constant pressure through the line 108 to the distribution chamber 109, flows through the bores 11 into the individual pressure chambers 112 and thence through the gap between the surfaces 102 and 114 or 115 into the chambers 106, 107 respectively. Thus, any sandy water in the chamber 106 is prevented from penetrating into the chamber 107. The barrier medium builds up a counter-pressure in the individual pressure chambers 112 and in the two sealing gaps, and thus builds up a counter-force, which varies with the gap width as shown by curve 21 in FIG. 3, and is thus dependent on the gap width. If the gap width is large, more barrier medium flows from the pressure chambers 112 through the sealing gap, so that there is a high pressure drop in the bores 111. Since, by assumption, the pressure in the chamber 109 is kept constant by the adjustment system, the pressure in the chambers 112 decreases when the gap increases and vice versa. Thus, at a pressure 22 (the point of intersection between curve 20 and curve 21), the sealing member 105 is in a stable equilibrium position at a given gap width. If the radial width of surfaces 114, 115, the length of the individual pressure chambers 112 in the peripheral direction and the length of the throttle bores 111 are suitably dimensioned, the gap width corresponding to the stable equilibrium position can be kept at a desired small value.

Referring to FIG. 4, wherein similar components as above are identified with reference characters of the 400 series rather than the 100 series, the barrier medium may also as a pressure medium. In this case, the barrier medium is supplied through a bore 408 in the stationary part 403 to a distribution chamber 409 which, in FIG. 4, is formed by the right portion of the annular groove 404. The sealing member 405 has axial bores 419 each provided with a nozzle-like constriction 411 or restrictor and each opening into a pressure chamber 412. A stationary part 401 and associated sealing surface 402 cooperate with the sealing surfaces 414, 415 on the sealing member 405. A web 413 is disposed between the two pressure chambers 412. In addition to the lip seal 416 and 417, seals 424, 425, 426, 427 428 (e.g. O-rings) are provided and inserted in corresponding grooves in the sealing member 405 and abut the wall of the groove 404. In this exaple, the groove 404 and the sealing member 405 have a shoulder so that, between the members 404 and 405, a chamber 430 is formed above the member 405 and a chamber 432 is formed below the member 405. These chambers 430, 432 are interconnected by bores 431. The chamber 432 is connected to the chamber 407 or atmosphere through a leakage line 433.

A narrow gap 429 between the seals 424, 425 is connected by a bore 440 to the bore 419 upstream of the restricter 411, so that the pressure of the barrier medium in chamber 409 also acts in the gap 429.

The aforementioned seals 424 – 428 are constructed so that the sealing member 405 "floats" in the groove 404, so that all the seal 424 – 428 are relieved from forces and thus offer no appreciable resistance to the sealing member 405 sliding in the groove. In other respects, the contactless seal between the sealing surfaces 402, 414 and 415 operates in the same manner as the seal in FIGS. 1 and 2.

Figure 5A:
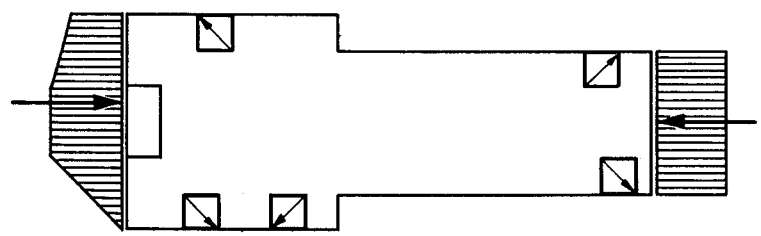
FIGS. 5a to 5c illustrate the sealing member of FIG. 4 with the forces and moments acting thereon.
Figure 5B:
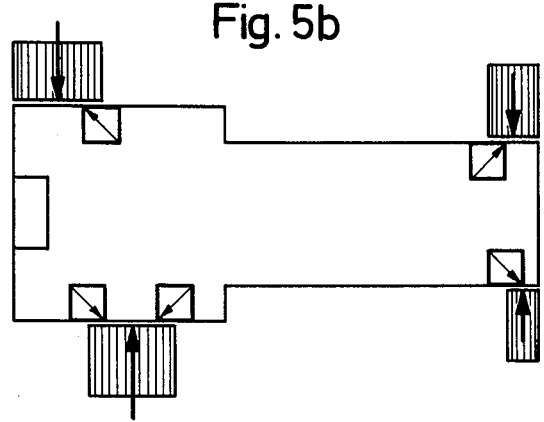
Figure 5C:
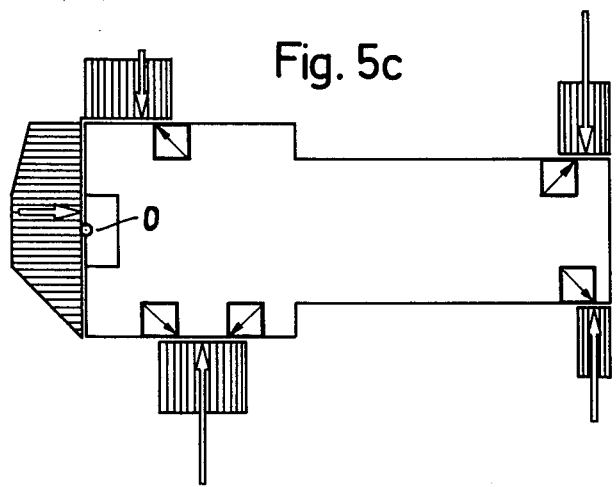

The position of seals 424 – 428 is determined so that sealing member 405 is in equilibrium, as shown in FIGS. 5a to 5C. in FIG. 5a, the two endfaces of the member 405 are each subjected to the pressure of the barrier medium multiplied by the area. In FIG. 5b, the bottom boundary surface of the member 405 is likewise acted upon by the pressure of the barrier medium multiplied by the corresponding areas and the top boundary surface on the right of seal 427 is subjected to the pressure of the barrier medium multiplied by the corresponding area and to the pressure of the medium in the chamber 406 multiplied by the corresponding area to the left of seal 428. FIG. 5c shows the force equilibrium condition above the point "O", i.e., the pressure multiplied by the area multiplied by the lever arm. The only pressures shown are the excess pressures compared with atmosphere.

When the position of seals 424 – 428 is determined, particularly in larger machines, a connection may be necessary, due to the geodetically determined pressure differences between the bottom and the top part of the seal in question. The embodiment in FIG. 4 has the special advantage of allowing relatively large axial displacement of the rotating part 401. The extent of this displacement is indicated by a double arrow 421 in FIG. 4. The position of the seal 424 closest to the surface 402 and the depth of the chambers 430 and 432 must be so selected that when the member 405 is displaced, sal 424 does not leave groove 404 and the sealing member 405 does not abut the shoulder in the stationary part 403 bounding chambers 430 and 432.

Similarly, in the embodiment in FIGS. 1 and 2, seals can be provided corresponding to seals 424 – 428, so that the sealing member 105 can slide backwards and forwards without appreciable resistance.

In the embodiments in FIGS. 1 and 4, the sealing member :5 or 405 is a one-piece ring extending inside the annular groove 104 or 404. FIG. 6, on the other hand, shows a sealing member 605 made up of a number of straight portions 655 disposed in a polygonal array. The individual pressure chanbers 612 in the sealing member 605 either communicate with a single portion 655 or a number of pressure chambers communicate with one portion 655. The ends of the portions 655 are interconnected by wedge-shaped resilient intermediate members 656. Mebers 656 can be made e.g. of rubber and be secured by vulcanization to the portions 655 to form an alternating array. This results in a particularly resilient sealing member 605, which can easily adapt to irregularities in the sealing surface of the rotating part while maintaining the desired gap.

If the straight length of a portion 655 is too long, the portion can be subdivided and the sub-portions assembled to form each portion by being articulated together by screws (not shown) through apertures 663, with the interposition of a flat seal 665. The screws are accessible through rectangular recesses 631. Supply bores 610 for the barrier medium extend between recesses 631. In the neighborhood of the parting line, the sub-portions are also interconnected by lugs 664 provided in the appropriate pressure chamber.

Figure 8:
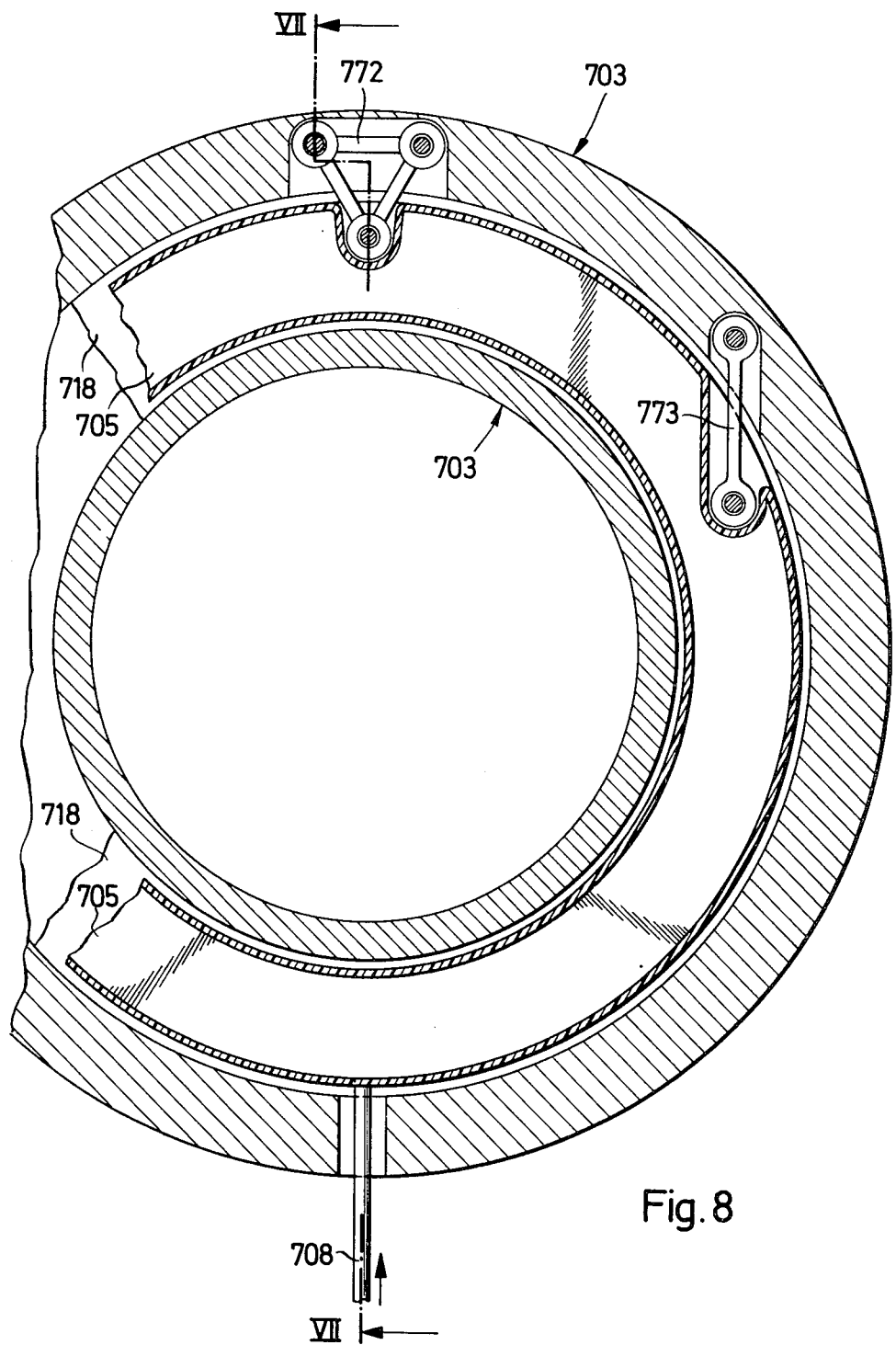
FIG. 8 illustrates a view taken on line VIII—VIII of FIG. 7.

Referring to FIGS. 7 and 8, wherein similar components as above are identified with reference characters of the 700 series rather than the 100 series, separate pressure and barrier media are used, as in the example in FIGS. 1 and 2. The sealing member 705 is constructed as a ring which is self-supporting but relatively resilient in the peripheral direction. The sealing member 705 is prevented from rotation in the peripheral direction and suspended from the stationary part 703 from three link supports 772, 773, only two of which are visible in FIG. 8. The resilient line 708 for supplying the barrier medium is connected to the distribution chamber 709. A restrictor 711 is provided in each partition wall between the chamber 709 and the pressure-chambers 712. A resilient tube 718 provided with an adjustable pressure-medium supply is used for moving the sealing member 705 towards the sealing surface 702 on the rotating part 701. In the embodiment in FIG. 7, the annular members 734, 735 having the sealing surfaces 714, 715 are made of a plastics having good dry-running properties, e.g. low-pressure polyethlene, whereas the webs 713 separating the individual pressure chambers 712 are made of the same substance as the sealing member 705. Annular members 734, 735 are secured in a suitable manner to the sealing member 705.

Figure 9:
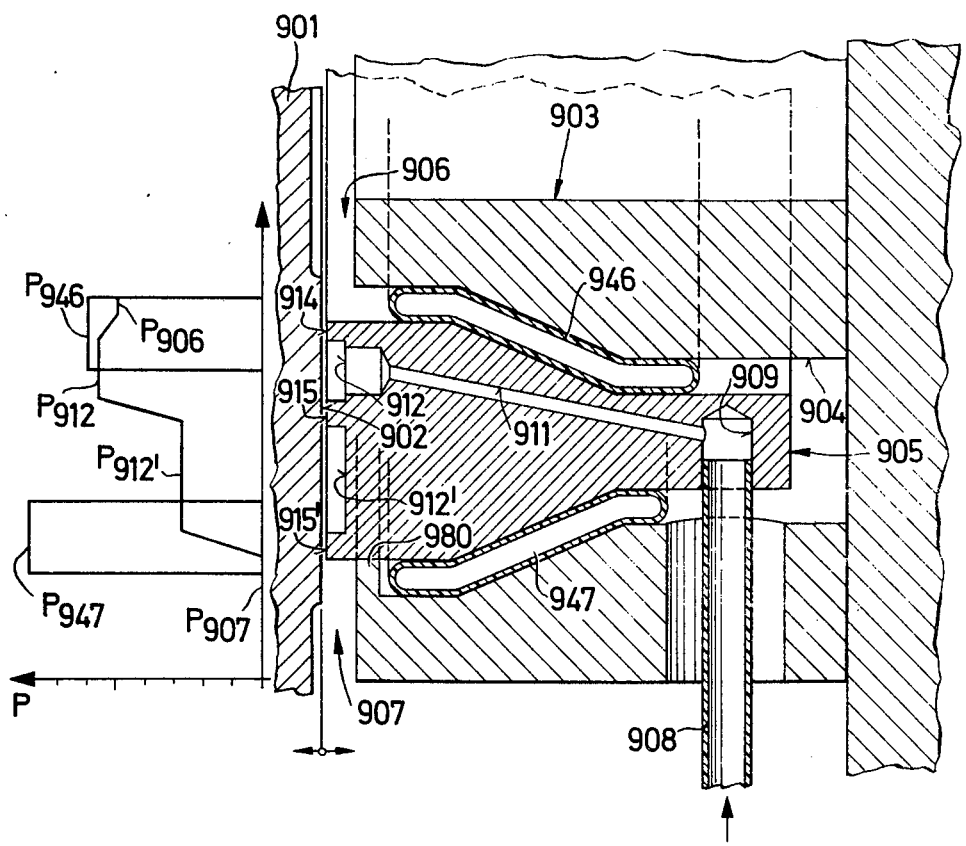
FIG. 9 illustrates a vertical sectional view through the bottom part of another embodiment of the seal according to the invention.

The seal operates in exactly the same manner as in FIGS. 1 and 2. Referring to FIG. 9, a rotating part 901 and an asssociated sealing surface are disposed opposite a sealing member 905 disposed in a stationary part 903 and supplied with barrier mediu via a flexible line 908. Throttle bores 911 lead from a distribution chamber 909 in the sealing member 905 to individual pressure chambers 912 distributed around the periphery. In this case, the sealing member 905 has three sealing surfaces 914, 915 and 915' concentric to the axis of rotation with pressure chambers 912 lying between sealing surfaces 914, 915 and additional pressure chambers 912' being likewise distributed around the periphery of the sealing member 905 and lying between sealing surfaces 915 abd 915'. The pressure chambers 912', however, are not connected to the distribution chamber 919 via separate restrictors. Two peripherally extending resilient tubes 946, 947, filled with a pressure medium, are provided between the boundary surfaces of the annular groove 904 and the sealing member 905. These tubes 946, 947 move the sealing member 905 towards the sealing surface 902 on the rotating part 901. In addition, the tubes ensure sealing-tightness between the groove 904 and the sealing member 905. In addition, the tubes 946, 947 have the function of absorbing the lateral forces exerted by the pressure in the chamber 906 on the sealing member, i.e., the pressure in tube 947 is made greater than the pressure in the tube 946. As a result, the guide shoulder 980 which extends only over the lower half of the periphery of the groove 904 needs to absorb only a small force. Thus, the frictional forces of the axially moveable guide member 905 do not appreciably interfere with its motion. The dimensions of the tubes 946, 947 and the pressure therein are selected so that the sealing member 905 is also in equilibrium with regard to the moments acting therein.

When the seal is in operation, the motion of the sealing member 905 caused by the pressure medium in the tubes 946 and 947 is counteracted by the pressure of the barrier medium in the chambers 912, 912' and in the gaps between the rotating sealing surface 902 on the one hand and sealing surfaces 914, 915, 915' on the other hand. The pressure curve in the pressure chambers and the three gaps is shown on the left in FIG. 9. The pressure in the tubes 946 and 947 is also shown. As can be seen, the pressure medium is set at the highest pressure in the chambers 912, and the pressure drops via the sealing surface 914 to the pressure in the chamber 906.

Figure 10:
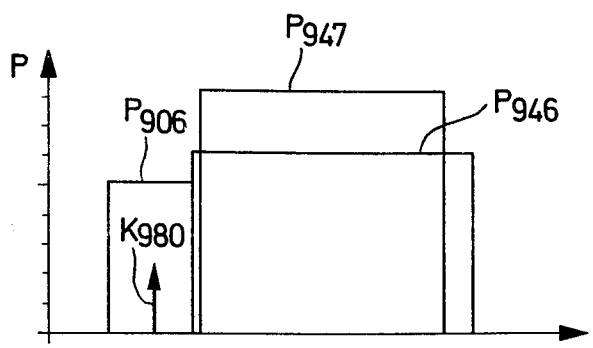
FIG. 10 illustrates a graph relating to the seal in FIG. 9.

In the other direction, the pressure drops via sealing surface 915 to an average pressure which prevails in the chambers 912' after which the pressure drops via sealing surface 915° to the pressure in the chamber 907 outside the machine, which is usually at atmospheric pressure. FIG. 10 shows the pressure in the chamber 906 and tubes 946, 947 and the bearing reaction K of the guide shoulder 980.

If the gap between the sealing surface of the rotating part 901 and the sealing surfaces of sealing member 905 decreases, the pressure in the chambers 912, 912' increases and thus returns the sealing member 905 to the equilibrium position with the predetermined gap width.

If the sealing member 905 tends to twist, e.g. if the gap between surfaces 902, 914 becomes narrower and the gap between surfaces 902, 915' becomes wider, the pressure in the chambers 912' decreases whereas the pressure in the chambers 912 increases. This produces a moment which returns member 905 to the correct equilibrium position.

In this embodiment also, the sealing member can be an annular ring or a polygonal ring.

Figure 11:
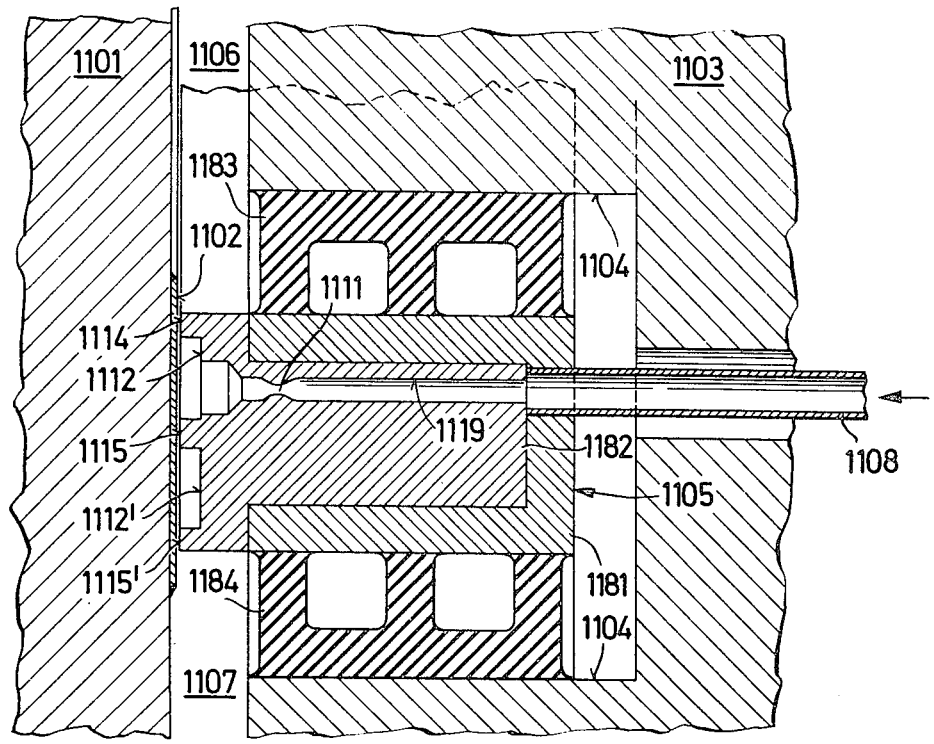
FIG. 11 illustrates a vertical sectional view through another embodiment of the seal according to the invention.

Referring to FIG. 11, a simple seal structure can be constructed where the pressure is provided not by a barrier medium or a pressure medium but by a prestressed element made of an elastomeric material. As shown, a rotating part 1101 with a corresponding sealing surface 1102 is sealed by a sealing member 1105 disposed in an annular groove 1104 of a stationary part 1103. The sealing member 1105 comprises two parts 1181 and 1182 which are fitted into one another and secured together in seal-tight manner, e.g. by a friction fit. Part 1181 of the sealing member is secured in seal-tight manner, e.g. by vulcanization, with the stationary part 1102 by rubber blocks 1183, 1184. The line 1108 for supplying barrier medium is connected to the part 1181 and a duct 1119 within the part 1182 connects the line 1108 via a restrictor 1111 to the pressure chamber 1112. Similar pressure-medium inlets are provided for the other pressure chambers, which are distributed over the periphery of the sealing member 1105. In the same manner as in the example in FIG. 9, the sealing member 1105 has three concentric sealing surfaces 1114, 1115 and 1115' and additional pressure chamber 1112' are provided between the two last-mentioned sealing surfaces.

When the seal is in operation, pressure builds up in the pressure chambers 1112 and 1112' and biases member 1105 away from the surface 1102, whereas the counteracting pressure forces result from the prestressing of the rubber blocks 1183 and 1184. When the pressure in the pressure chambers decreases, the parts of the blocks facing the member 1105 move towards the sealing surface 1102. The rubber blocks 183, 1184 also perform a sealing functions, so that no medium can escape from the chamber 1106 to the annular groove 1104.

Figure 12:
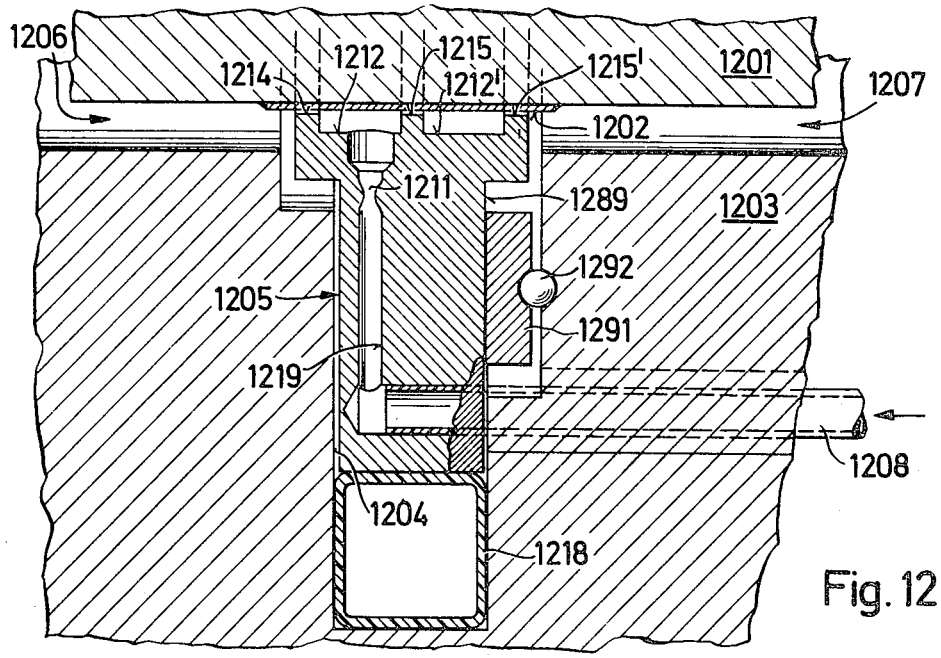
FIG. 12 illustrates a vertical sectional view through still another embodiment of the seal according to the invention.

In the previously described embodiments, the contactless seals operate in the axial direction. In the embodiments in FIGS. 12 to 14, the countactless seal acts in the radial direction. FIG. 12 shows a rotating part 1201 and a corresponding sealing surface 1202, the surfaces having the shape of a circular cylinder. A stationary part 1203 has an annular groove 1204 receiving a sealing member 1205. The outside of the sealing member 1205 bears against a tube 1218 provided with a supply of pressure medium (not shown). The sealing member 1205 has three sealing surface 1214, 1215, 1215' and pressure chambers 1212, 1212' are formed in the sealing member between each pair of adjacent sealing surfaces around the periphery of the member 1205. The pressure chambers 1212 are each connected to a barrier-medium supply 1208 via at least one duct 1219 having a restrictor 1211. The individual chambers 1212, 1212' are separated by axial webs. In FIG. 12 the chamber 1206, which is at a high pressure is to the left of sealing surface 1214, whereas the lower-pressure chamber 1207 which is normally connected to atmosphere is to the right of the sealing surface 1215'.

The sealing member 1205 is made up of individual segments to form a complete ring. The individual segments of the member 1205 are articulated together e.g. as shown in FIG. 14. The ends of two segments 1205' have shoulders and overlap in the peripheral direction. At the place where the ends overlap, bolts 1286 are provided for interconnecting the segments, their shanks being surrounded by an aperture 1287 having a large clearance in one of the two segments. Owing to this clearance, the sealing member can expand peripherally somewhat, e.g. as a result of thermal expansion, without jamming the segments together. In order to ensure that the parting line 1288 between the overlapping ends of the segments closes when acted upon by the pressure in the chamber 1206, the side surface 1289 of a segment facing the chamber 1207 is offset slightly compared with the side surface 1289 of the neighboring segment. Thus, the surfaces along the line 1288 can abut in sealtight manner.

The side surfaces 1289 of the segments each abut the stationary part 1203 via segment-shaped hinged bearings 1291, so that the segments 1205' can adjust to any position of the sealing surface 1202 on the rotating part, even if the stationary part 1203 tilts somewhat with respect to the rotating part 1201. In order to enable the bearing 1291 to tilt, balls 1292 are provided, or alternatively the segment-shaped bearings 1291 have spherical protuberances which project into corresponding recesses in the adjacent surface of the annular groove 1204. The spherical bearing points of each hinged segment 1291 line on a straight line.

FIG. 13 shows another embodiment of the hinged bearing, in which the segments of the sealing member bear against a member 1293 having an H-shaped cross-section. This member 1293 has a perforated web so as to be flexible and so that the two flanges can pivot relative to one another. The member 1293 can be firmly anchored in the stationary part 1203. In FIG. 13, the supply of barrier medium is omitted for simplicity.

Basically, the seal operates in the same manner as in FIG. 1 and 2.

Alternatively, in contrast to the embodiments described in FIGS. 9, 11 and 12, the barrier medium can be supplied via restrictors the chambers 912', 1112', 1212' instead of the adjacent chambers 912, 1112, and 1212, or alternatively both series of pressure chambers can be connected to the barrier-medium supply by restrictors. In both cases, the amount of gap is somewhat greater than in the described embodiments.

Alternatively, without departing from the scope of the invention, the pressure may be partly exerted by the force of resilient elements and partly by a pressure medium and/or barrier medium.

What is claimed is:

1. In combination with a stationary part and a rotatble part disposed to rotate about an axis of rotation and defining a space with said stationary part, a contactless seal for sealing the space between said parts; said seal including a sealing member disposed about said axis of rotation and having at least two sealing surfaces concentric to said axis of rotation and spaced from said rotatable part to define gaps therebetween for the escape of barrier medium, said sealing member including a plurality of segments movably mounted in said stationary part for movement under a biasing force towards said rotatable part, each said segment having at least one pressure chamber between said sealing surfaces, said chamber being open towards said rotatable part and being connectable to a supply of barrier medium to receive a flow of barrier medium therefrom, said chambers of said segments being distributed peripherally of said sealing member;

a plurality of restrictors, each restrictor being disposed between a respective one of said chambers and the supply of barrier medium to throttle the flow of barrier medium to said respective chamber; and means biasing each said segment toward said rotatable part.

2. The combination as set forth in claim 1 wherein said means comprises a resilient tube in said stationary part and abutting said sealing member on a side opposite said sealing surfaces, said tube being connected to a pressure medium supply means for biasing said sealing member towards said rotatable part in response to an increase in pressure within said tube.

3. The combination as set forth in claim 1 wherein said means comprises a pressure chamber in said stationary part adjacent said sealing member on a side opposite said sealing surfaces, said pressure chamber being connected to the supply of barrier medium whereby the barrier medium exerts pressure on said sealing member for biasing said sealing member towards said rotatable part.

4. The combination as set forth in claim 1 wherein said annular sealing member and said annular groove have tapering cross-sections in a direction away from said rotatable part and said means comprises a pair of resilient tubes beteween said sealing member and said stationary part within said annular groove, said tubes being filled with a pressure medium to bias said sealing member towards said rotatable member.

5. The combination as set forth in claim 4 which further includes a second pressure chamber in each said sealing member segment concentric to said first pressure chamber and a third sealing surface adjacent said second pressure chamber.

6. The combination as set forth in claim 1 wherein said plurality of segments are straight and are disposed in a polygonal array, said portions being disposed in an annular groove in said stationary part.

7. The combination as set forth in claim 6 which further includes a plurality of elastomeric members disposed in alternating manner with said straight portions.

8. The combination as set forth in claim 1 which further includes a plurality of peripheral seals between said sealing member and said stationary part whereby said sealing member floats in said stationary part.

9. The combination as set forth in claim 1 wherein said sealing surfaces are made of self-lubricating plastics.

10. The combination as set forth in claim 2 wherein said means includes a plurality of resilient elements between said stationary part and said sealing member biasing said sealing member towards said rotatable member.

11. The combination as set forth in claim 10 wherein said resilient elements are made of elastomeric material.

12. The combination as set forth in claim 11 wherein said resilient elements are blocks vulcanized to said stationary part and said sealing member.

13. The combination as set forth in claim 1 wherein said parts are coaxially disposed in facing relation to each other and said sealing surfaces are perpendicular to said axis.

14. The combination as set forth in claim 1 wherein said parts are concentric to each other and said sealing surfaces are coaxial of said axis.

15. The combination as set forth in claim 14 wherein said segments are annular segments.

16. The combination as set forth in claim 15 wherein said segments are axially movable in a slot in said stationary part.

17. The combination as set forth in claim 15 wherein said segments are radially movable in a slot in said stationary part.

18. The combination as set forth in claim 15 wherein said segments are articulated together to permit circumferential expansion and contraction of said sealing member.

19. The combination as set forth in claim 1 wherein each segment is abutted against said stationary part on a side transverse to said sealing surfaces and facing away from said space to be sealed.

* * * * *

UNITED STATES PATENT AND TRADEMARK OFFICE
CERTIFICATE OF CORRECTION

PATENT NO. : 4,118,040    Page 1 of 2
DATED : October 3, 1978
INVENTOR(S) : ALFRED CHRIST, LUDWIG KANTOR, HELMUT MILLER It is certified that error appears in the above-identified patent and that said Letters Patent are hereby corrected as shown below:

Column 1, line 17, change "towardsthe" to --towards the--
Column 1, line 51, change "steel" to --seal--
Column 1, line 56, change "on" to --in--
Column 1, line 65, change "memer" to --member--
Column 2, line 7, change "directions" to --direction--
Column 2, line 33, change "narrow" to --narrower--
Column 3, line 42, change "in" to --is--
Column 3, line 64, change "11" to --111--
Column 4, line 1, change "It" to --If--
Column 4, line 11, change "11" to --111--
Column 4, line 38 after "also" insert --act--
Column 4, line 48, change "seal" to --seals--
Column 4, line 52, change "exaple" to --example--
Column 4, line 61, change "restricter" to --restrictor--

UNITED STATES PATENT AND TRADEMARK OFFICE
CERTIFICATE OF CORRECTION

PATENT NO. : 4,118,040
DATED : October 3, 1978
INVENTOR(S) : ALFRED CHRIST, LUDWIG KANTOR, HELMUT MILLER It is certified that error appears in the above-identified patent and that said Letters Patent are hereby corrected as shown below:

```
Column 4, line 65, change "seal" to --seals--
Column 5, line 5, change "in" to --In--
Column 5, line 30, change "sol" to --seal--
Column 5, line 39, change ":5" to --105--
Column 5, line 43, change "chanbers" to --chambers--
Column 6, line 25, change "mediu" to --medium--
Column 6, line 34, change "abd" to --and--
Column 7, line 4, change "915°" to --915'--
Column 7, line 44, change "chamber" to --chambers--
Column 7, line 54, change "183" to --1183--
Column 7, line 55, change "functions" to --function--
Column 7, line 67, change "surface" to --surfaces--
Column 8, line 41, change first occurrence of "line" to --lie--
Column 8, line 54, change "the" to --to--
Column 8, line 65, change "rotatble" to --rotatable--
Column 9, line 44, change "between" to --between--
```

Signed and Sealed this

Twenty-seventh Day of March 1979

[SEAL]

Attest:

RUTH C. MASON
Attesting Officer

DONALD W. BANNER
Commissioner of Patents and Trademarks